United States Patent [19]

Nishida et al.

[11] Patent Number: 5,753,413
[45] Date of Patent: May 19, 1998

[54] REWRITABLE MEDIUM FOR RECORDING INFORMATION IN WHICH THE ATOMIC ARRANGEMENT IS CHANGED WITHOUT THE SHAPE BEING CHANGED AND THE OPTICAL CONSTANT IS CHANGED

[75] Inventors: Tetsuya Nishida, Nakano; Yumiko Anzai, Tachikawa, both of Japan

[73] Assignees: Hitachi, Ltd., Tokyo; Hitachi Maxell, Ltd., Osaku-fu, both of Japan

[21] Appl. No.: 615,810

[22] Filed: Mar. 14, 1996

[30] Foreign Application Priority Data

Mar. 20, 1995 [JP] Japan ................................. 7-060307

[51] Int. Cl.⁶ ............................................. G11B 7/24
[52] U.S. Cl. .................. 430/270.13; 430/945; 369/284
[58] Field of Search .......................... 430/270.13, 945, 430/270.11; 369/284, 288

[56] References Cited

U.S. PATENT DOCUMENTS 5,479,382  12/1995  Nishida et al. ...................... 369/13
5,604,003  2/1997   Coombs ........................... 430/270.13

FOREIGN PATENT DOCUMENTS 47-26897   7/1972  Japan.
57-24039   2/1982  Japan.
62-161587  7/1987  Japan.
62-161588  7/1987  Japan.
62-161589  7/1987  Japan.
62-161590  7/1987  Japan.
1-051989   2/1989  Japan.
4-228126   8/1992  Japan.
4-254925   9/1992  Japan.
6-44606    2/1994  Japan.

*Primary Examiner*—John A. McPherson
*Attorney, Agent, or Firm*—Antonelli, Terry, Stout, & Kraus, LLP

[57] ABSTRACT

An information recording medium comprises at least a substrate, a recording layer which is installed on the substrate via a protection layer and in which the atomic arrangement is changed without the shape thereof being changed when a recording energy beam is irradiated and the optical constants are changed, and a reflection layer reflecting the recording energy beam and by making the information recording medium comprise a material such that the mean composition of the recording layer is expressed by a general expression of $A_w Ge_x Te_y Se_z$ (where symbols w, x, y, and z indicate atomic percent and have the predetermined values and A indicates at least one of the predetermined elements Sb, Cr, Co, In, and Ag, etc.), an information recording medium in which the recording, erasing, and reproducing characteristics are satisfactory and the stability is kept superior for a long period of time can be obtained.

42 Claims, 1 Drawing Sheet

1

REWRITABLE MEDIUM FOR RECORDING INFORMATION IN WHICH THE ATOMIC ARRANGEMENT IS CHANGED WITHOUT THE SHAPE BEING CHANGED AND THE OPTICAL CONSTANT IS CHANGED

BACKGROUND OF THE INVENTION

The present invention relates to an information recording medium which can record digital information in real time such as an analog video or audio signal which is FM-modulated, data of an electronic computer, a facsimile signal, and a digital audio signal by a recording energy beam such as a laser beam or an electron beam.

There are various systems of recording data on a thin film by an energy beam such as a laser beam or an electron beam. In a recording system using a phase change (may be called a phase transition) between the crystalline structure and the amorphous structure of a recording layer material itself or between one crystallized structure and another crystallized structure, diffusion of atoms between layers of constituted thin films, and changing of the optical constants due to changing of the atomic arrangement such as photodarkening, the structured thin film is little deformed. Therefore, the recording system has an advantage that it is possible to produce a single disk whose surface is just covered with a protective coating material for protection of scratch and a double sided disk comprising two disks which are directly bonded. A number of developments relating to this kind of recording have been applied and a number of thin films including the Te—Ge system, As—Te—Ge system, and the Te—O system are described in Japanese Patent Publication 47-26897 which is the earliest one. In Japanese Patent Application Laid-Open 57-24039, thin films such as $Sb_{25}Te_{12.5}Se_{62.5}$, $Cd_{14}Te_{14}Se_{72}$, $Bi_2Se_3$, $Sb_2Se_3$, $In_{20}Te_{20}Se_{60}$, $Bi_{25}Te_{12.5}Se_{62.5}$, CuSe, and $Te_{33}Se_{67}$ are described.

A dedicated reproduction type optical information storage medium such as a compact disc (CD), CD-ROM, Video-CD, or laser disc has a structure so as to be suitable for mass production that concave or convex prepits having information beforehand are formed on a polycarbonate substrate or an acrylic substrate by a transfer art such as an injection method or a photopolymerization method, and a metallic reflection layer having a high reflectivity of 70% or more to a reproduction energy beam such as Al or Au is formed directly on them, and furthermore an organic protective layer is formed on it for scratch protection. As a result, the reflection ratio to a reproduction energy beam in the flat portion of the aforementioned dedicated reproduction type optical information storage medium is as high considerably as 70% or more. Therefore, to allow a recordable information recording medium using a recording energy beam to preserve complete compatibility with the aforementioned dedicated reproduction type optical information storage medium, it is necessary that the reflection ratio in the unrecorded portion or the recorded portion is as high as 70% or more. An information recording medium of a type that data is recorded (or erased) by a change in the optical constants due to a change in the atomic arrangement of the material of a recording layer as the aforementioned information recording medium is described in Japanese Patent Application Laid-Open 4-228126, Japanese Patent Application Laid-Open 4-254925, and Japanese Patent Application Laid-Open 6-44606.

In the aforementioned information recording medium of the prior art, the composition of recording layer and film structure are not optimized, so that when such a medium is used as an information recording medium which can write data once or can rewrite data, there are problems imposed that the reproduced signal strength is not sufficiently high, and the reproduced waveform is distorted extremely, and a large unerased portion remains, and the recording sensitivity is bad, and the reversibility is small.

An object of the present invention is to provide an information recording medium which has satisfactory recording and reproduction characteristics, a high recording sensitivity, and a satisfactory rewriting performance.

SUMMARY OF THE INVENTION

To accomplish the object of the present invention, an information recording medium comprises at least a substrate, a recording layer which is formed directly on the substrate or via a protective layer comprising at least one of an inorganic substance and an organic substance and in which the atomic arrangement is changed without the shape thereof being changed when a recording energy beam is irradiated and the optical constants are changed, and a reflection layer reflecting the recording energy beam and the information recording medium comprises a material in which the mean composition of the recording layer is expressed by a general expression of $A_wGe_xTe_ySe_z$ (where symbols w, x, y, and z indicate atomic percent, and their values are within the ranges of $1 \leq w \leq 20$, $30 \leq x \leq 70$, $1 \leq y \leq 34$, and $1 \leq z \leq 29$ respectively, and A indicates at least one element selected from the group consisting of Sb, Bi, Al, Ga, In, Si, Sn, Pb, Sc, Ti, V, Cr, Mn, Fe, Co, Ni, Zn, Y, Zr, Nb, Mo, Ru, Rh, Pd, Cd, La, Hf, Ta, W, Re, Os, Ir, Pt, Au, Ag, and Cu). According to the present invention, the mean composition of the recording layer or the reflection layer means the mean composition in the direction of film thickness.

In the recording layer of the information recording medium of the present invention, the shape thereof is not changed even if an energy beam such as a laser beam or an electron beam is irradiated, and a phase change (phase change between the crystal and amorphous substance of the material of recording layer itself) is caused as an atomic arrangement change, and the optical constants are changed. Information is reproduced by a power reproduction energy beam for the irradiation time during which the recording layer is not changed.

Information is recorded or erased by a power energy beam (for example, a semiconductor laser beam) for the irradiation time during which the aforementioned atomic arrangement change can be caused and the recording layer is not deformed greatly and information is reproduced by a power energy beam for the irradiation time during which no atomic arrangement change is caused.

The Role of each element among the elements expressed by A of the recording layer of the information recording medium of the present invention is as follows: The alloy system including Ge, Te, and Se can execute crystallization for recording at high speed with the stability of the amorphous status kept. Moreover, the difference in the optical constant between the crystallized structure and the amorphous structure of the recording layer is large, so that the reproduced signal strength also can be increased. Furthermore, by coexistence of elements expressed by A such as Sb, the stability of the amorphous status can be increased more and the rewriting performance and the life of recording points can be improved more.

The elements Sb and Bi of the Vb group among the typical elements in the elements expressed by A are desirable in respect of improving the rewriting performance. The elements Si, Sn, and Pb of the IVb group are desirable in respect of improving the stability of the amorphous status and the elements Al, Ga, and In of the IIIb group are desirable in respect of increasing the reproduced signal strength.

The elements Au, Ag, and Cu of the Ib group among the transition metallic elements in the elements expressed by A are desirable in respect of increasing the crystallization speed for recording. The other transition metallic elements such as Cr, Co, and Pd are desirable in respect of decreasing the distortion of reproduced waveform for rewriting many times.

A desirable element among the elements of the Vb group among the typical elements of the elements expressed by A is Sb, and a desirable element among the elements of the IVb group is Sn, and a desirable element among the IIIb group is Bi. A desirable element among the elements of the Ib group among the transition metallic elements of the elements expressed by A is Ag and desirable elements among the elements of other than the Ib group are Cr and Co.

A change in the content of each element in the recording layer in the direction of film thickness is small, though an optional pattern change may exist. Particularly when the content of Se in the neighborhood of one of the interfaces of the recording layer (it may be an interface with another layer) is larger than that on the inner side, the oxidation resistance improves.

It is desirable to change the optical property by any change in the atomic arrangement by irradiating a recording energy beam without the shape of the recording layer being little changed in addition to phase change, diffusion of atoms, and photodarkening. For example, it may be a change in the diameter of crystal grains or the crystal form or a change between the crystallized structure and the metastable status ($\pi$, $\gamma$, etc.) or between metastable statuses. Even when a change is caused between the amorphous status and the crystallized status, it is possible that the amorphous status is not completely amorphous but a crystallized portion coexists. It is possible that data is recorded by transferring (due to chemical reaction or others) a part of the atoms constituting the recording layer or the protective layer to the protective layer or the recording layer or by both phase change and atom transfer.

When the content of Sb is changed with the relative ratio to the other elements kept almost constant in a recording layer of the Ge—Te—Se—Sb system and the rewritable count and the carrier to noise ratio when a repetitive signal of 11T and a repetitive signal of 3T are overwritten at a linear speed of 5.6 m/s are measured, the rewritable count when the Sb content is 0 atomic percent is as very small as 50 times and when the Sb content is 25%, the read out signal modulation degree is small. Therefore, the carrier to noise ratio is lower than the lowest level 45 dB at which a signal can be reproduced as a digital signal free of an error such as 43 dB. When the Sb content is within a range from 1 atomic percent to 20 atomic percent, both the rewritable count and the carrier to noise ratio show satisfactory characteristics. When the Sb content is within a range from 2 atomic percent to 10 atomic percent, both the rewritable count and the carrier to noise ratio show particularly satisfactory characteristics.

Next, when the Sb content is fixed to 4 atomic percent, and the ratio of the Te content to the Se content is fixed to 2:1, and the ratio of the Ge content to the total of the contents of Ge, Te, and Se $\{x/(x+y+z)\}$ is changed in a recording layer of a composition of $Ge_{48}Te_{32}Se_{16}Sb_4$, the crystallization time of the recording layer itself (the shortest irradiation time necessary for erasing) and the rewritable count when a repetitive signal of 11T and a repetitive signal of 3T are overwritten at a linear speed of 1.4 m/s are measured. As a result, when the ratio of the Ge content to the total of the contents of Ge, Te, and Se $\{x/(x+y+z)\}$ is 0.25 or 0.75, the crystallization time of the recording layer is long such as 5 µs and overwriting cannot be executed at a linear speed of 1.4 m/s. When $0.3<\{x/(x+y+z)\}<0.7$, the crystallization time is short such as 1 µs and overwriting can be executed at a linear speed of 1.4 m/s. When $0.4<\{x/(x+y+z)\}<0.65$, both the crystallization time and overwriting show satisfactory characteristics. When $0.45<\{x/(x+y+z)\}<0.6$, both the crystallization time and overwriting show particularly satisfactory characteristics.

Next, when the Sb content is fixed to 4 atomic percent, and the Ge content is fixed to 48 atomic percent, and the content of Te and Se [the ratio of the Te content to the total of the contents of Te and Se $\{y/(y+z)\}$] is changed in a recording layer of a composition of $Ge_{48}Te_{32}Se_{16}Sb_4$, the crystallization time of the recording layer itself (the shortest irradiation time necessary for erasing) and the holding life of the recording point until the carrier to noise ratio when a disk is left under the condition of 60° C. and 95% RH is reduced to 3 dB are measured. As a result, when the content of Te is large such as 38 atomic percent, the holding life of the recording point is short and the disk is not suited to an information recording medium. When the content of Se is large such as 32 atomic percent, the crystallization time is as long as 3 µs and overwriting cannot be executed. When the content of Te is 34 atomic percent or less and the content of Se is 29 atomic percent or less, both the crystallization time and the holding life of the recording point show satisfactory characteristics. When the ratio of the Te content to the total of the contents of Te and Se $\{y/(y+z)\}$ is 0.45 or more, the crystallization time shows a particularly satisfactory characteristic such as 0.5 µs.

From the aforementioned experiment results, the ranges within which the ratios w, x, y, and z of the constituent elements of the recording layer show satisfactory characteristics are as shown below.

$1 \leq w \leq 20$, $0.3 \leq x/(x+y+z) \leq 0.7$, $1 \leq y \leq 34$, and $1 \leq z \leq 29$.

More desirable ranges of w, x, y, and z are as shown below.

$1 \leq w \leq 20$ and $0.4 \leq x/(x+y+z) \leq 0.65$.

Still more desirable ranges of w, x, y, and z are as shown below.

$1 \leq w \leq 15$ and $0.45 \leq x/(x+y+z) \leq 0.6$.

Particularly desirable ranges of w, x, y, and z are as shown below.

$2 \leq w \leq 10$, $0.45 \leq x/(x+y+z) \leq 0.6$, and $0.45 \leq y/(y+z)$.

Therefore, it is desirable that the additional amount of an element expressed by A is within a range from 1 atomic percent to 20 atomic percent and when the additional amount is beyond the range, the recording and reproducing characteristics are degraded. It is more desirable that the additional amount of an element expressed by A is within a range from 1 atomic percent to 15 atomic percent and it is still more desirable that the additional amount is within a range from 2 atomic percent to 10 atomic percent.

In the recording layer and the reflection layer of the present invention, when the mean composition in the direction of film thickness is within the aforementioned ranges, it is possible that the composition is changed in the direction of film thickness. It is desirable that the composition does not change discontinuously.

Even if a part or the whole of Sb is replaced by at least one element selected from among Bi, Al, Ga, In, Si, Sn, Pb, Sc, Ti, V, Cr, Mn, Fe, Co, Ni, Zn, Y, Zr, Nb, Mo, Ru, Rh, Pd, Cd, La, Hf, Ta, W, Re, Os, Ir, Pt, Au, Ag, and Cu in a recording layer of the Ge—Te—Se—Sb system, when data is recorded, reproduced, and erased as a reversible type, characteristics which are very similar to each other are obtained. Elements among the aforementioned elements expressed by A in the general expression which have particularly satisfactory recording, reproducing, and erasing characteristics are Sb in the Vb group, Sn in the IVb group, In in the IIIb group, Ag in the Ib group, and Cr and Co in the transition metallic elements of other than the Ib group.

In the reflection layer of the information recording medium of the present invention, at least one element of Al, Au, Ag, and Cu is a main component. When the Co content is changed in a reflection layer of a composition of $Au_{97}Co_3$ in atomic percent, the reflection factor of the reflection layer, the electric resistivity and thermal conductivity at 298K, and the recording power when a repetitive signal of 11T at EFM is overwritten at a linear speed of 1.4 m/s are measured. As a result, when the Co content is less than 0.5 atomic percent, the electric resistivity at 298K is less than 7 µΩ·cm, so that the thermal conductivity at 298K is more than 105 W/m·K and no data can be recorded at 45 mW on the surface of the disk. When the Co content is more than 15 atomic percent, the reflection factor is less than 85% and it is difficult that the disk reflection factor becomes 65% or more. When the Co content is within a range from 1 atomic percent to 8 atomic percent, the reflection factor of the reflection layer is high such as 91% or more, so that the disk reflection factor can be increased more. When the Co content is within a range from 2 atomic percent to 5 atomic percent, the disk reflection factor is high and the electric resistivity is high such as 14 µΩ·cm or more, so that the thermal conductivity is as low as 53 W/m·K or less and the recording sensitivity and the erasing sensitivity are satisfactory. Even if a part or the whole of Co is replaced by at least one element among Al, Si, Sc, Ti, V, Cr, Mn, Fe, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, and Bi, the same result is obtained. When Co among the aforementioned additional elements is added, the recording sensitivity and the erasing sensitivity are satisfactory compared with the other elements. When Pd is added, the oxidation resistance of the reflection layer is satisfactory. When Ti is added, the diameter of crystal grains of the reflection layer is small and the noise is low. When Mo is added, the adherence of the reflection layer is satisfactory and the erasing ratio of the rewritable type is large. On the other hand, when Ni is added, the adhesive strength of the reflection layer is lower than that of the other additional element and the rewriting count of the rewritable type is limited. When Cr is added, the unevenness of the surface of the reflection layer is slightly larger than that of the other additional elements and the disk noise is slightly higher.

In a recording layer of a composition of $Au_{97}Co_3$, even if a recording layer of a composition of $Au_{50}Ag_{50}$ is used in place of $Au_{97}Co_3$, the same result is obtained.

When the Ag content is changed in the aforementioned recording layer of a composition of $Au_{50}Ag_{50}$, the reflection factor of the reflection layer itself for a reproduction light beam, the disk reflection factor when a repetitive signal of 11T at EFM is overwritten at a linear speed of 1.4 m/s, the electric resistivity and thermal conductivity at 298K, and the recording power are measured. As a result, when the Ag content is less than 10 atomic percent or more than 90 atomic percent, the electric resistivity at 298K is less than 7 µΩ·cm, so that the thermal conductivity at 298K is more than 105 W/m·K and a high recording power is necessary such as 35 mW or more on the surface of the disk though the disk reflection factor is low such as 34%. When the Ag content is within a range from 30 atomic percent to 70 atomic percent, the electric resistivity is high such as 14 µΩ·cm or more, so that the thermal conductivity is as low as 53 W/m·K or less and the recording sensitivity and the erasing sensitivity are satisfactory. Furthermore, even if a reflection layer of the Au—Cu system is used in place of the aforementioned reflection layer of the Au—Ag system, the same result is obtained.

From the above results, when the mean composition of a reflection layer in the direction of film thickness is expressed by a general expression $(Au)_{100-x}(A)_x$ (where a symbol x indicates atomic percent and has a value of $0.5 \leq x \leq 15$ and A indicates at least one element of Al, Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, and Bi) or a general expression $(Au)_{100-y}(D)_y$ (where a symbol y indicates atomic percent and has a value of $15 \leq y \leq 85$ and D indicates at least one element of Ag and Cu), the reflection factor of the reflection layer itself for a reproduction light beam is as high as 85% or more and the electric resistivity at 298K is 7 µΩ·cm or more, so that the thermal conductivity is as low as 105 W/m·K or less. In this case, the reflection factor of the medium for the reproduction light beam from the substrate side of the information recording medium is 65% or more in the unrecorded portion and 45% or less in the recorded portion or 45% or less in the unrecorded portion and 65% or more in the recorded portion and the recording sensitivity and the erasing sensitivity improve greatly. Furthermore, when the initial reflection factor in the unrecorded portion of the mirror portion is 70% or more and the reflection factor in the recorded portion is 28% or less, the medium can conform perfectly to the red book of the CD standard, the orange book Part II of the CD-R (write-once type CD) standard, so that it can be read satisfactorily in an apparatus of a dedicated reproduction CD or a laser disk.

When the reflection layer is installed on the opposite side of the substrate of the recording layer in the information recording medium of the present invention, a high read out signal modulation degree can be obtained. In this case, it is desirable that the film thickness of the reflection layer is within a range from 30 nm to 200 nm and the information recording medium has a constitution that a substrate 1, a lower protection layer 2, a recording layer 3, an upper protection layer 4, and a reflection layer 5 are formed in this order from the substrate side (FIG. 1).

When reflection layers are installed on both sides of the recording layer, the high reflection factor and the high read out signal modulation degree can be compatible with each other. In this case, it is desirable that the film thickness of the lower reflection layer on the substrate side is within a range from 5 nm to 30 nm and the film thickness of the upper reflection layer on the opposite side of the substrate is within a range from 30 nm to 200 nm.

Furthermore, the film thickness of a recording layer which is within a range from 10 nm to 250 nm is particularly desirable because a change in the reflection factor due to recording becomes larger by the effect of light interference. When the film thickness is within a range from 10 nm to 100 nm, it is more desirable because the recording sensitivity is also high. In this case, the information recording medium has a constitution that a substrate 7, a lower reflection layer 8, a lower protection layer 9, a recording layer 10, an upper protection layer 11, and an upper reflection layer 12 are formed in this order from the substrate side (FIG. 2).

In a part of the information recording medium of the present invention, dedicated reproduction data is formed in a shape of concave or convex prepits on the substrate beforehand and coexists with other rewritable data. In the portion of a repetitive signal of 11T at EFM at a linear speed of 1.4 m/s in the dedicated reproduction data portion, the reflection factor in the flat portion is 71% and a reproduction signal output of a carrier to noise ratio of 63 dB is obtained at a read out signal modulation degree of 82% and a measurement band of 10 kHz. In the portion of a repetitive signal of 3T at EFM, a reproduction signal output at a read out signal modulation degree of 58% and a carrier to noise ratio of 60 dB is obtained.

As explained above, according to the present invention, as an information recording medium which has at least a recording layer and a reflection layer and records data by irradiating a recording energy beam, an information recording medium on which the recording, erasing, and reproducing characteristics are satisfactory, and the recording and erasing sensitivities are high, and the stability is kept superior for a long period of time can be obtained. Furthermore, an information recording medium on which a recording light beam of an inexpensive low-output type can be used because the recording and erasing sensitivities are high even if the reflection factor of a medium for a reproduction light beam from the substrate side is as high as 65% or more, and the recording, erasing, and reproducing characteristics are superior, and the holding life of recorded data is long, and the environment resistance is superior can be obtained. Information recorded in the aforementioned information recording medium having a reflection factor of 65% or more can be read by an inexpensive dedicated reproduction apparatus for a compact disk (CD) or a laser disk which is now widespread.

DESCRIPTION OF THE PREFERRED EMBODIMENTS

EMBODIMENT 1

Figure 1:
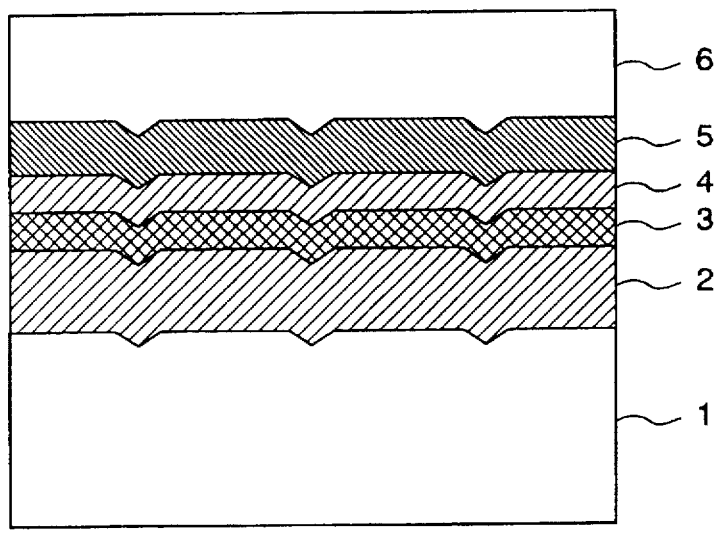
FIG. 1 is a cross sectional view showing the structure of an information recording medium of a disk I in this embodiment.

FIG. 1 shows a disk I which is an embodiment of the present invention. On a replica substrate 1 in which a spiral groove with a pitch of 1.6 μm for tracking is formed on the surface of a disk-shaped polycarbonate plate with a diameter of 120 mm and a thickness of 1.2 mm by the injection method, a lower protection layer 2 of a composition of $(ZnS)_{80}(SiO_2)_{20}$ of atomic percent is formed with a film thickness of 130 nm first by using a radio frequency magnetron sputtering apparatus. Then, a recording layer 3 of a composition of $Ge_{48}Te_{32}Se_{16}Sb_4$ of atomic percent is formed with a film thickness of 25 nm in the same sputtering apparatus. Then, an upper protection layer 4 of a composition of $(ZnS)_{80}(SiO_2)_{20}$ of atomic percent is formed with a film thickness of 25 nm in the same sputtering apparatus. Then, a reflection layer 5 of a composition of $Al_{97}Ti_3$ of atomic percent is formed with a film thickness of 70 nm in the same sputtering apparatus. Furthermore, an organic layer 6 with a thickness of 50 μm is formed by curing ultraviolet curing resin which is spin-coated on the reflection layer 5.

Using the disk I which is prepared as mentioned above as a reversible type, recording, erasing, and reproduction are evaluated by an optical disk drive (semiconductor laser wave length 780 nm, maximum power 50 mW on the disk surface) as shown below. The disk reflection factor immediately after the disk I is prepared is as low as 8%, so that when the disk is initialized overall by a laser beam equivalent to a power of 18 mW on the disk surface at a linear speed of 5.6 m/s, the reflection factor increases from 8% to 34%. Next, by rotating the disk at a fixed linear speed, keeping continuous light from the semiconductor laser at a low level at which no data is recorded in an optional radius position, focusing it by an object lens of a numerical aperture of 0.55 in the optical head, and irradiating it to the recording layer 3 via the substrate 1, and detecting the reflected light, the head is driven so that the center of the light spot always coincides with each middle between tracking grooves. By using each middle between grooves as a recording track, the effect of noise generated from grooves can be avoided. By executing tracking like this and furthermore automatic focusing so that the focal point is set on the recording layer, recording and erasing are executed at the same time by overwriting by one beam. When data is recorded on a track (middle between tracking grooves) by crystallization, the range of laser power which is suited to crystallization is a range such that it is high enough for generation of crystallization and it is lower than that for generation of amorphization. When data is erased by amorphization, the range of laser power which is suited to amorphization is a range such that it is higher than that for crystallization and lower than that for strong deformation or boring. Overwriting by one beam is executed by changing the laser power between the intermediate power level for generating crystallization and the high power level for generating amorphization. It is particularly desirable that the power ratio between the high power level for amorphization and the intermediate power level for crystallization is within a range from 1:04 to 1:0.8. When the recording portion passes, the laser power is lowered to the reproduction light level at which nothing is changed and the tracking and automatic focusing are continued. The tracking and automatic focusing are continued even during recording. By doing this, even if information is recorded in a portion where information is already recorded, the recorded information is rewritten to the newly recorded information. However, if continuous light of a power close to the higher power of the aforementioned laser power modulation is irradiated so as to erase a record by the first rotation or a plurality of rotations for rewriting the record and a laser beam which is modulated between the high power level and the intermediate power level according to an information signal is irradiated so as to record information by the next one rotation, the unerased portion of the information which is previously written is little and a high carrier to noise ratio is obtained. In this case, when the power of continuous light which is irradiated first is within a range from 0.8 to 1.1 assuming the aforementioned high power level as 1, satisfactory rewriting can be executed.

The linear speed of the disk I is set to 5.6 m/s, and the reproduction light level is set to 1.0 mW, and the laser power is changed between the intermediate power level (on the disk surface) due to crystallization and the high power level (on the disk surface) due to amorphization so as to record information. Continuous light of 1.0 mW on the disk surface at the reproduction light level at which no recording and erasing are executed is irradiated by executing tracking and automatic focusing on the track which is recorded in this way and the information is reproduced by detecting the intensity of the reflected light. In this case, a repetitive signal (0.79 MHz, duty 50%) of 11T at 8 to 14 modulation (EFM) and a repetitive signal (2.88 MHz, duty 50%) of 3T are divided into multi-pulses of 8.64 MHz and a duty of 50% and the recording laser beam is modulated between the high power level 30 mW and the intermediate power level 18 mW so as to execute overwriting. In this case, from the medium reflectivity (Ro) in the unrecorded portion and the medium reflectivity (Rw) in the information recorded portion, the read out signal modulation amplitude (Mod) in the information recorded portion is defined as indicated by the following Formula 1:

$$[Mod(\%) = 100 \times |Ro - Rw|/Ro] \quad \text{Formula 1}$$

When the repetitive signal of 11T at EFM is recorded first, the reflectivity in the recording laser beam irradiation portion changes from 34% to 12% and a reproduction signal output of a carrier to noise ratio of 60 dB is obtained at a read out signal modulation amplitude of 65% with a resolution band width of 10 kHz. If the repetitive signal of 3T at EFM is overwritten furthermore, a reproduction signal output of a carrier to noise ratio of 58 dB and of an erasing ratio of 30 dB of the previous signal (repetitive signal of 11T) is obtained at a read out signal modulation amplitude of 61% with a measurement band width of 10 kHz. In this case, the rewritable cycles is 100000 times or more.

The oxidation resistance of the aforementioned disk I is extremely superior and even if the disk I is left under the condition of 60° C. and 95% RH for 3000 hours, the medium reflectivity or transmissivity for a laser beam is not changed. Even if the disk I on which a repetitive signal of 3T at EFM is overwritten at a linear speed of 5.6 m/s beforehand is left under the condition of 60° C. and 95% RH for 3000 hours, the read out signal modulation amplitude and the carrier to noise ratio of a reproduction signal output are not changed.

In the recording layer 3 of the Ge—Te—Se—Sb system of the disk I, when the relative ratio of the other elements is kept almost constant and the Sb content is changed, the rewritable cycles and the carrier to noise ratio when a repetitive signal of 11T and a repetitive signal of 3T are overwritten at a linear speed of 5.6 m/s are changed as shown in Table 1.

TABLE 1

| Composition of recording layer (atomic percent) | Cyclability | Carrier to noise ratio |
| --- | --- | --- |
| $Ge_{50}Te_{33.3}Se_{16.7}Sb_0$ | 50 times | 58 dB |
| $Ge_{49.5}Te_{33}Se_{16.5}Sb_1$ | 10000 times | 58 dB |
| $Ge_{49}Te_{32.7}Se_{16.3}Sb_2$ | 50000 times | 59 dB |
| $Ge_{48}Te_{32}Se_{16}Sb_4$ | 100000 times | 60 dB |
| $Ge_{46}Te_{30.7}Se_{15.3}Sb_8$ | 100000 times | 59 dB |
| $Ge_{45}Te_{30}Se_{15}Sb_{10}$ | 100000 times | 58 dB |
| $Ge_{42.5}Te_{28.3}Se_{14.2}Sb_{15}$ | 100000 times | 55 dB |
| $Ge_{40}Te_{26.6}Se_{13.3}Sb_{20}$ | 50000 times | 50 dB |
| $Ge_{37.5}Te_{25}Se_{12.5}Sb_{25}$ | 10000 times | 43 dB |

When the Sb content is 0 atomic percent, the rewritable count is very small such as 50 times and when the Sb content is 25 atomic percent, the carrier to noise ratio is 43 dB which is lower than the lowest level 45 dB at which a signal can be reproduced as a digital signal free of an error because the read out signal modulation amplitude is small. When the Sb content is within a range from 1 atomic percent to 20 atomic percent, the rewritable count and the carrier to noise ratio show satisfactory characteristics. When the Sb content is within a range from 2 atomic percent to 10 atomic percent, both the rewritable count and the carrier to noise ratio show particularly satisfactory characteristics.

When the Sb content is fixed to 4 atomic percent, and the ratio of the Te content to the Se content is fixed to 2:1, and the ratio of the Ge content to the total of the contents of Ge, Te, and Se $\{x/(x+y+z)\}$ is changed in the recording layer 3 of a composition of $Ge_{48}Te_{32}Se_{16}Sb_4$, the crystallization time of the recording layer itself (the shortest irradiation time necessary for erasing) and the rewritable cycles when a repetitive signal of 11T and a repetitive signal of 3T are overwritten at a linear speed of 1.4 m/s are changed as shown in Table 2.

TABLE 2

| $\{x/(x + y + z)\}$ | Crystallization time | Cyclability |
| --- | --- | --- |
| 0.25 | 10 µs | Overwriting disabled |
| 0.3 | 1 µs | 10000 times |
| 0.35 | 0.8 µs | 10000 times |
| 0.4 | 0.5 µs | 50000 times |
| 0.45 | 0.3 µs | 100000 times |
| 0.5 | 0.15 µs | 100000 times |
| 0.55 | 0.2 µs | 100000 times |
| 0.6 | 0.3 µs | 100000 times |
| 0.65 | 0.5 µs | 50000 times |
| 0.7 | 0.8 µs | 10000 times |
| 0.75 | 5 µs | Overwriting disabled |

In this case, when the ratio of the Ge content to the total of the contents of Ge, Te, and Se $\{x/(x+y+z)\}$ is 0.25 or 0.75, the crystallization time of the recording layer is as long as 5 µs or more and overwriting cannot be executed at a linear speed of 1.4 m/s. When $0.3 < \{x/(x+y+z)\} < 0.7$, the crystallization time is as short as 1 µs and overwriting can be executed at a linear speed of 1.4 m/s. When $0.4 < \{x/(x+y+z)\} < 0.65$, both the crystallization time and overwriting show satisfactory characteristics. When $0.45 < \{x/(x+y+z)\} < 0.6$, both the crystallization time and overwriting show particularly satisfactory characteristics.

When the Sb content is fixed to 4 atomic percent, and the Ge content is fixed to 48 atomic percent, and the content of Te and Se [the ratio of the Te content to the total of the contents of Te and Se $\{y/(y+z)\}$ is changed in the recording layer 3 of a composition of $Ge_{48}Te_{32}Se_{16}Sb_4$ of the disk I, the crystallization time of the recording layer itself (the shortest irradiation time necessary for erasing) and the retention life of the recording marks until the carrier to noise ratio when the disk is left under the condition of 60° C. and 95% RH is reduced by 3 dB are changed as shown in Table 3.

TABLE 3

| Composition of recording layer (atomic percent) | $\{y/(y + z)\}$ | Crystallization time | Retention life of recording marks |
| --- | --- | --- | --- |
| $Ge_{48}Te_{38}Se_{10}Sb_4$ | 0.792 | 0.1 µs | 1000 hours |
| $Ge_{48}Te_{34}Se_{14}Sb_4$ | 0.708 | 0.12 µs | 3000 hours or more |
| $Ge_{48}Te_{32}Se_{16}Sb_4$ | 0.667 | 0.15 µs | 3000 hours or more |
| $Ge_{48}Te_{28}Se_{20}Sb_4$ | 0.583 | 0.25 µs | 3000 hours or more |
| $Ge_{48}Te_{24}Se_{24}Sb_4$ | 0.5 | 0.3 µs | 3000 hours or more |
| $Ge_{48}Te_{22}Se_{26}Sb_4$ | 0.458 | 0.5 µs | 3000 hours or more |
| $Ge_{48}Te_{19}Se_{29}Sb_4$ | 0.396 | 0.8 µs | 3000 hours or more |
| $Ge_{48}Te_{16}Se_{32}Sb_4$ | 0.333 | 3.0 µs | 3000 hours or more |

In this case, when the content of Te is as large as 38 atomic percent, the retention life of the recording marks is short and the disk is not suited to an information recording medium. When the content of Se is as large as 32 atomic percent, the crystallization time is as long as 3 µs and overwriting cannot be executed. When the content of Te is 34 atomic percent or less and the content of Se is 32 atomic percent or less, both the crystallization time and the retention life of the recording marks show satisfactory characteristics. When the ratio of the Te content to the total of the contents of Te and Se {y/(y+z)} is 0.45 or more, the crystallization time shows a particularly satisfactory characteristic such as 0.5 µs.

From the aforementioned experiment results, the ranges within which the ratios w, x, y, and z of the constituent elements of the recording layer show satisfactory characteristics are as shown below.

$1 \leq w \leq 20$, $0.3 \leq x/(x+y+z) \leq 0.7$, $1 \leq y \leq 34$, and $1 \leq z \leq 29$.

More desirable ranges of w, x, y, and z are as shown below.

$1 \leq w \leq 20$ and $0.4 \leq x/(x+y+z) \leq 0.65$.

Still more desirable ranges of w, x, y, and z are as shown below.

$1 \leq w \leq 15$ and $0.45 \leq x/(x+y+z) \leq 0.6$.

Particularly desirable ranges of w, x, y, and z are as shown below.

$2 \leq w \leq 10$, $0.45 \leq x/(x+y+z) \leq 0.6$, and $0.45 \leq y/(y+Z)$

Therefore, it is desirable that the incorporated amount of an element expressed by A is within a range from 1 atomic percent to 20 atomic percent and when the incorporated amount is beyond the range, the recording and reproducing characteristics are degraded. It is more desirable that the incorporated amount of an element expressed by A is within a range from 1 atomic percent to 15 atomic percent and it is still more desirable that the incorporated amount is within a range from 2 atomic percent to 10 atomic percent.

In the recording layer and the reflection layer of the present invention, when the mean composition in the direction of film thickness is within the aforementioned ranges, it is possible that the composition is changed in the direction of film thickness. It is desirable that the composition does not change discontinuously.

A rare gas element such as Ar or Xe may get mixed in a recording layer depending on conditions for forming the recording layer such as sputtering and no particularly remarkable effect is produced in the recording and reproduction characteristics by addition of a rare gas element as mentioned above. When the incorporated amount is as small as less than 5 atomic percent, no great adverse effect is produced. However, when 5 atomic percent or more is mixed in, it is necessary to take care because the reproduction waveform is greatly distorted when data is rewritten many times.

Even if a part or the whole of Sb is replaced by at least one element selected from among Bi, Al, Ga, In, Si, Sn, Pb, Sc, Ti, V, Cr, Mn, Fe, Co, Ni, Zn, Y, Zr, Nb, Mo, Ru, Rh, Pd, Cd, La, Hf, Ta, W, Re, Os, Ir, Pt, Au, Ag, and Cu in the recording layer 3 of the Ge—Te—Se—Sb system of the disk I, when data is recorded, reproduced, and erased as a reversible type, characteristics which are very similar to each other are obtained. Elements among the aforementioned elements expressed by A in the general expression which have particularly satisfactory recording, reproducing, and erasing characteristics are Sb in the Vb group, Sn in the IVb group, In in the IIIb group, Ag in the Ib group, and Cr and Co in the transition metallic elements of other than the Ib group.

In place of the reflection layer 5 of a composition of $Al_{97}Ti_3$ of the disk I, even if a reflection layer composed of one of the other Al alloy, Au alloy, Ag alloy, and Cu alloy is used, the same result is obtained.

When the film thickness of the recording layer 3 in the disk I is within a range from 5 nm to 500 nm, data can be recorded by a semiconductor laser. In respect of that a change in the reflection factor due to recording becomes larger by the effect of light interference, it is desirable that the film thickness is within a range from 10 nm to 250 nm. When the film thickness is within a range from 10 nm to 100 nm, it is more desirable because the recording sensitivity is also high.

When the film thickness of the reflection layer 5 in the disk I is within a range from 20 nm to 500 nm, the disk reflectivity is 30% or more and data can be recorded by a semiconductor laser. In respect of that the read out signal modulation degree can be increased more and the recording sensitivity is also high, it is more desirable that the film thickness is within a range from 30 nm to 200 nm.

Even if a semiconductor laser with a wave length of 830 nm is used in place of a semiconductor laser with a wave length of 780 nm in the optical disk drive, by slightly adjusting the film thickness of each layer in the disk I except the reflection layer 5, the same results of recording, erasing, and reproducing characteristics are obtained. When data which is recorded and erased by an optical disk drive having a semiconductor laser with a wave length of 780 nm is reproduced by an optical disk drive having a semiconductor laser with a wave length of 680 nm or 630 nm, by slightly adjusting the film thickness of each layer in the disk I except the reflection layer 5 according to the respective wave length, the same result of reproducing characteristic is obtained.

Two disks I are bonded to each other with the surfaces on the opposite side of the substrate located inside by using hot melt type adhesive. In the bonded disks, the recording, erasing, and reproducing characteristics which are quite equal to the aforementioned case of this embodiment are obtained on both surfaces and the capacity per each disk can be doubled.

EMBODIMENT 2

Figure 2:
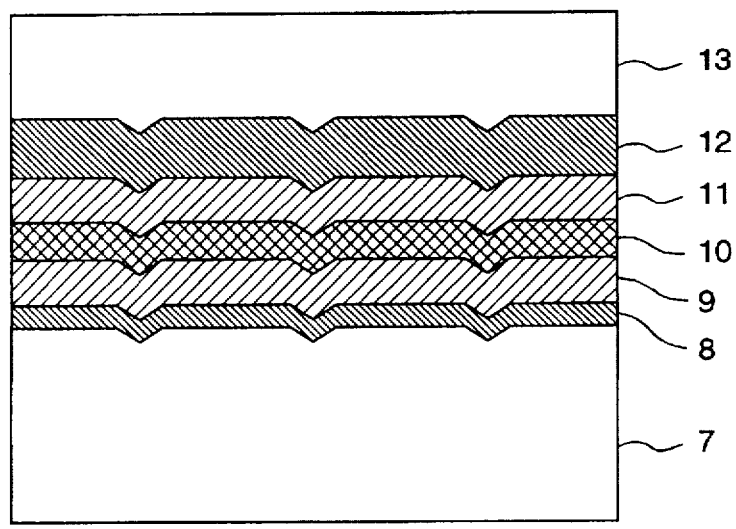
FIG. 2 is a cross sectional view showing the structure of an information recording medium of a disk II in this embodiment.

FIG. 2 shows a disk II which is another embodiment of the present invention. On a replica substrate 7 in which a spiral groove with a pitch of 1.2 µm for tracking is formed on the surface of a disk-shaped polycarbonate plate with a diameter of 120 mm and a thickness of 1.2 mm by the injection method, a lower reflection layer 8 of a composition of $Au_{97}Co_3$ represented by atomic percent is formed with a film thickness of 13 nm first by using a high frequency magnetron sputtering apparatus. Then, a lower protection layer 9 of a composition of $(ZnS)_{80}(SiO_2)_{20}$ represented by atomic percent is formed with a film thickness of 25 nm in the same sputtering apparatus. Then, a recording layer 10 of a composition of $Ge_{48}Te_{32}Se_{16}Sb_4$ represented by atomic percent is formed with a film thickness of 20 nm in the same sputtering apparatus. Then, an upper protection layer 11 of a composition of $(ZnS)_{80}(SiO_2)_{20}$ represented by atomic percent is formed with a film thickness of 40 nm in the same sputtering apparatus. Then, an upper reflection layer 12 of a composition of $Au_{97}Co_3$ represented by atomic percent is formed with a film thickness of 35 nm in the same sputtering apparatus. Furthermore, an organic layer 13 with a thickness of 50 µm is formed by curing ultraviolet curing resin which is spin-coated on the upper reflection layer 12. FIG. 2 shows a cross sectional structure diagram of the disk II which is prepared as mentioned above.

Using the disk II which is prepared as mentioned above as a reversible type, recording, erasing, and reproduction are evaluated by an optical disk drive (recording, erasing, and reproducing apparatus) by rotating the disk at a fixed linear speed in the same was as with Embodiment 1. The disk reflectivity immediately after the disk II is prepared is low such as 14%, so that when the disk is initialized overall by a laser beam equivalent to a power of 18 mW on the disk surface at a linear speed of 1.4 m/s, the reflectivity increases from 14% to 71%. The linear speed of the disk II is set to 1.4 m/s, and the reproduction light power level is set to 1.0 mW, and the laser power is changed between the intermediate power level (on the disk surface) due to crystallization and the high power level (on the disk surface) due to amorphization so as to record information. A repetitive signal (0.2 MHz, duty 50%) of 11T at EFM and a repetitive signal (0.72 MHz, duty 50%) of 3T are divided into multi-pulses of 2.16 MHz and a duty of 33% and overwriting is executed by using recording laser beams of a high power level of 31.5 mW and an intermediate power level of 17 mW alternately. When the repetitive signal of 11T at EFM is recorded first, the reflection factor in the recording laser beam irradiation portion changes from 71% to 24% and a reproduction signal output of a carrier to noise ratio of 61 dB is obtained at a read out signal modulation amplitude of 66% and a measurement band width of 10 kHz. If the repetitive signal of 3T at EFM is overwritten furthermore, a reproduction signal output of a carrier to noise ratio of 58 dB and of an erasing ratio of 30 dB of the previous signal (repetitive signal of 11T) is obtained at a read out signal modulation amplitude of 49% and a measurement band width of 10 kHz. In this case, the rewritable count is 10000 times or more. The oxidation resistance of the aforementioned disk II is extremely superior and even if the disk II is left under the condition of 60° C. and 95% RH for 3000 hours, the medium reflectivity or transmissivity for a laser beam is not changed. Even if the disk II on which a repetitive signal of 3T at EFM is overwritten at a linear speed of 1.4 m/s beforehand is left under the condition of 60° C. and 95% RH for 3000 hours, the read out signal modulation amplitude and the carrier to noise ratio of a reproduction signal output are not changed.

When the Co content is changed in the lower reflection layer 8 and the upper reflection layer 12 of a composition of $Au_{97}Co_3$ in the disk II, the reflectivity of the upper reflection layer 12, the electric resistivity and thermal conductivity at 298 K, and the recording power (high power level) when a repetitive signal of 11T at EFM is overwritten at a linear speed of 1.4 m/s are changed as shown in Table 4.

TABLE 4

| Co content (Atomic %) | Reflectivity (%) | Electric resistivity (μΩ cm) | Thermal conductivity (W/m · K) | Recording power (mW) |
|---|---|---|---|---|
| 0 | 98 | 3 | 245 | Unrecordable at 50 mW |
| 0.5 | 97.5 | 7 | 105 | 45 |
| 1 | 97 | 9 | 82 | 38 |
| 2 | 96 | 14 | 53 | 33 |
| 3 | 95 | 19 | 39 | 30 |
| 4 | 94 | 26 | 28 | 27 |
| 5 | 93 | 32 | 23 | 25 |
| 8 | 91 | 33 | 22 | 24.5 |
| 10 | 89 | 33 | 22 | 24 |
| 15 | 85 | 33 | 22 | 23 |
| 20 | 80 | 33 | 22 | 22 |

In this case, when the Co content is less than 0.5 atomic percent, the electric resistivity at 298K becomes less than 7 μΩ·cm, so that the thermal conductivity at 298K becomes more than 105 W/m·K and no data can be recorded at 45 mW on the disk surface. When the Co content is more than 15 atomic percent, the reflectivity becomes less than 85% and it is difficult that the disk reflectivity becomes 65% or more. When the Co content is within a range from 1 atomic percent to 8 atomic percent, the reflectivity of the reflection layer is as high as 91% or more, so that the disk reflection factor can be increased more. When the Co content is within a range from 2 atomic percent to 5 atomic percent, the disk reflectivity is high and the electric resistivity is as high as 14 μΩ·cm or more, so that the thermal conductivity is as low as 53 W/m·K or less and the recording sensitivity and the erasing sensitivity are satisfactory. Even if a part or the whole of Co is replaced by at least one element selected from among Al, Si, Sc, Ti, V, Cr, Mn, Fe, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, and Bi, the same result is obtained. When Co is added among the aforementioned additional elements, the recording sensitivity and the erasing sensitivity are satisfactory compared with the other elements. When Pd is added, the oxidation resistance of the reflection layers 8 and 12 is satisfactory. When Ti is added, the crystal grain diameter of the reflection layers 8 and 12 is small and the noise is low. When Mo is added, the adhesion of the reflection layers 8 and 12 is satisfactory and the erasing ratio of the rewritable type is high. On the other hand, when Ni is added, the adhesive strength of the reflection layers 8 and 12 is lower than that of the other additional elements and the rewriting count of the rewritable type is limited. When Cr is added, the roughness of each surface of the reflection layers 8 and 12 is slightly larger than that of the other additional elements and the disk noise is slightly higher.

In the lower reflection layer 8 and the upper reflection layer 12 of a composition of $Au_{97}Co_3$ in the disk II, even if a reflection layer of a composition of $Au_{50}Ag_{50}$ is used in place of $Au_{97}Co_3$, the same result is obtained.

When the Ag content is changed in the aforementioned lower reflection layer 8 and upper reflection layer 12 of a composition of $Au_{50}Ag_{50}$, the reflection factor of the reflection layers themselves for a reproduction light beam, the disk reflection factor when a repetitive signal of 11T at EFM is overwritten at a linear speed of 1.4 m/s, the electric resistivity at 298K, the thermal conductivity at 298 K, and the recording power (high power level) are changed as shown in Table 5.

TABLE 5

| Composition (Atomic %) | Reflectivity (%) | Electric resistivity (μΩ cm) | Thermal conductivity (W/m · K) | Recording power (mW) |
|---|---|---|---|---|
| $Au_{90}Ag_{10}$ | 97 | 5 | 147 | Unrecordable at 50 mW |
| $Au_{85}Ag_{15}$ | 97 | 7 | 105 | 48 |
| $Au_{80}Ag_{20}$ | 96.5 | 9 | 82 | 40 |
| $Au_{70}Ag_{30}$ | 96.5 | 14 | 53 | 34 |
| $Au_{60}Ag_{40}$ | 96 | 15.5 | 47 | 32 |
| $Au_{50}Ag_{50}$ | 96 | 16 | 46 | 30 |
| $Au_{40}Ag_{60}$ | 96 | 15.5 | 47 | 32 |
| $Au_{30}Ag_{70}$ | 96.5 | 14 | 53 | 34 |
| $Au_{20}Ag_{80}$ | 96.5 | 9.5 | 77 | 38 |
| $Au_{15}Ag_{85}$ | 97 | 7 | 105 | 48 |
| $Au_{10}Ag_{90}$ | 97 | 4.5 | 163 | Unrecordable at 50 mW |

In this case, when the Ag content is less than 10 atomic percent or more than 90 atomic percent, the electric resistivity at 298K is less than 7 μΩ·cm, so that the thermal conductivity at 298K is more than 105 W/m·K and such a high recording power as 35 mW or more is necessary on the surface of the disk though the disk reflectivity is as low as 34%. When the Ag content is within a range from 30 atomic percent to 70 atomic percent, the electric resistivity is as high as 14 μΩ·cm or more, so that the thermal conductivity is as low as 53 W/m·K or less and the recording sensitivity and the erasing sensitivity are satisfactory. Furthermore, even if a reflection layer of the Au—Cu system is used in place of the aforementioned reflection layer of the Au—Ag system, the same result is obtained.

When the film thickness of the upper reflection layer 12 in the disk II is within a range from 20 nm to 500 nm, the disk reflection factor is 65% or more and data can be recorded by a semiconductor laser. In respect of that the reflectivity can be increased more and the recording sensitivity is also high, it is more desirable that the film thickness is within a range from 30 nm to 200 nm. When the film thickness of the lower reflection layer 8 is within a range from 2 nm to 40 nm, the disk reflection factor is 65% or more and data can be recorded by a semiconductor laser. In respect of that the reflection factor can be increased more and the recording sensitivity is also high, it is more desirable that the film thickness is within a range from 5 nm to 30 nm. When the film thicknesses of the lower reflection layer 8 and the upper reflection layer 12 are within the aforementioned ranges even if the reflection layers are different in the composition, the same result is obtained.

Even if a semiconductor laser with a wave length of 830 nm is used in place of a semiconductor laser with a wave length of 780 nm in the optical disk drive, by slightly adjusting the film thickness of each layer in the disk II except the upper reflection layer 12, the same results of recording, erasing, and reproducing characteristics are obtained. When data which is recorded and erased by an optical disk drive having a semiconductor laser with a wave length of 780 nm is reproduced by an optical disk drive having a semiconductor laser with a wave length of 680 nm or 630 nm, by slightly adjusting the film thickness of each layer in the disk II except the upper reflection layer 12 according to the respective wave length, the same result of reproducing characteristic is obtained.

When at least one surface of the recording layer of the information recording medium of the present invention is adhered and protected by a protection layer formed by a different material (FIG. 1), the environment resistance of the information recording medium is improved and when both sides thereof are protected as shown in FIG. 2, the environment resistance of the information recording medium is improved more and the rewriting performance when it is used as a reversible type is improved.

These protection layers may be formed from inorganic substances containing, for example, an oxide, fluoride, nitride, sulfide, carbide, boride, boron, carbon, or metal as a main component. Or, the protection layers may be formed from an organic substance such as, for example, acrylic resin, polycarbonate, polyolefine, epoxy resin, polyimide, polyamide, polystyrene, polyethylene, polyethylene terephthalate, fluorine-contained resin (poly-4-fluorinated ethylene), or ultraviolet curing resin. Furthermore, the protection layers may be formed from a composite material thereof.

An example of an inorganic protection layer comprises as a main component an oxide of at least one element selected from the group consisting of Ce, La, Si, In, Al, Ge, Pb, Sn, Bi, Te, Ta, Sc, Y, Ti, Zr, V, Nb, Cr, and W, a sulfide of at least one element selected from the group consisting of Cd, Zn, Ga, In, Sb, Ge, Sn, Pb, and Bi, a fluoride of Mg, Ce, Ca or the like, a nitride of Si, Al, Ta, B or the like, a carbide of B, Si or the like, a boride of Ti or the like, boron, and carbon and for example, the main component thereof has a composition close to one of $SiO_2$, $SiO$, $CeO_2$, $La_2O_3$, $In_2O_3$, $Al_2O_3$, $GeO$, $GeO_2$, $PbO$, $SnO$, $SnO_2$, $Bi_2O_3$, $TeO_2$, $Ta_2O_5$, $Sc_2O_3$, $Y_2O_3$, $TiO_2$, $ZrO_2$, $V_2O_5$, $Nb_2O_5$, $Cr_2O_3$, $WO_2$, $WO_3$, $ZnS$, $CdS$, $In_2S_3$, $Sb_2S_3$, $Ga_2S_3$, $GeS$, $SnS$, $SnS_2$, $PbS$, $Bi_2S_3$, $MgF_2$, $CeF_3$, $CaF_2$, $TaN$, $Si_3N_4$, $AlN$, $BN$, $Si$, $TiB_2$, $B_4C$, $SiC$, $B$, and $C$ or a mixture thereof. Among these inorganic protection layers, a sulfide which is close to ZnS is desirable in respect of that the refractive index is suitably high and the layer is stable, and a nitride which has a composition close to TaN, $Si_3N_4$, or AlN (aluminum nitride) is desirable, in respect of that the surface reflection factor is not so high and the layer is stable and strong. A desirable oxide is a one having a composition of $SiO_2$, $SiO$, $Y_2O_3$, $Sc_2O_3$, $CeO_2$, $TiO_2$, $ZrO_2$, $Ta_2O_5$, $In_2O_3$, $Al_2O_3$, or $SnO_2$ or close to one of them. An amorphous Si containing hydrogen is also desirable. Among mixtures, a mixture of ZnS and $SiO_2$ is desirable in respect of that the recording sensitivity is satisfactory.

In inorganic and organic protection layers, it is desirable for heat resistance that a recording layer is adhered closely to an inorganic protection layer. However, when an inorganic layer is thick, at least one of occurrence of cracks, reduction in the transmissivity, and reduction in the sensitivity is caused easily, so that it is desirable that the above inorganic layer is made thin and a thick organic layer is adhered to the side of the inorganic layer opposite to the recording layer so as to increase the mechanical strength. By doing this, deformation is hard to occur. A material used for an organic layer is, for example, polystyrene, poly-4-fluorinated ethylene, polyimide, acrylic resin, polyolefine, polyethylene terephthalate, polycarbonate, epoxy resin, ethylene-vinyl acetate copolymer which is known as a hot melt adhesive, pressure sensitive adhesive, or ultraviolet curing resin.

A protective layer composed of inorganic substances may be formed by electron beam deposition or sputtering as it is. However, it can be produced easily by forming a layer composed of at least one element of metal, metalloid, and semiconductor by reactive sputtering and then allowing it to react with at least one of oxygen, sulfur, and nitrogen.

Use of multi protection layers increases the protection effect more. For example, when a thin film with a thickness between 10 nm and 300 nm having a composition close to $SiO_2$ is formed on the far side from the recording layer and a thin film with a thickness between 10 nm and 300 nm having a composition close to ZnS is formed on the near side to the recording layer, the environment resistance and the recording and erasing characteristics improve greatly and the rewriting performance can be improved substantially. When the aforementioned protection layer is formed on the substrate side (light entering side), it can serve as a reflection prevention layer for increasing the reproduction signal strength.

When the film thickness of each layer is within the ranges indicated below, satisfactory recording, erasing, and reproduction are possible.

Film thickness of recording layer: From 5 nm to 500 nm

Film thickness of reflection layer: From 5 nm to 500 nm

Film thickness of inorganic protection layer: From 5 nm to 500 nm

Film thickness of organic protection layer: From 500 nm to 5 mm

When the film thickness of each layer is within the ranges indicated below, more satisfactory recording and reproduction are possible.

Film thickness of recording layer: From 10 nm to 300 nm

Film thickness of reflection layer: From 5 nm to 200 nm

Film thickness of inorganic protection layer: From 10 nm to 300 nm

Film thickness of organic protection layer: From 2 μm to 0.5 mm

Even if ZnS, SiO$_2$, SiO, CeO$_2$, Al$_2$O$_3$, Ta$_2$O$_5$, Y$_2$O$_3$, ZrO$_2$, V$_2$O$_5$, TaN, Si$_3$N$_4$, or AlN or a mixture thereof in which the extinction coefficient which is the imaginary part of the complex refractive index for a laser beam is 0.2 or less is used in the same way in place of the (ZnS)—(SiO$_2$) system which is used for the protection layers in the disks I and II, by controlling each film thickness according to the respective optical constants, the same recording and erasing characteristics as those of the disk II are obtained.

In a disk comprising two disks II which are bonded to each other with the surfaces on the opposite side of the substrate located inside by using two-part mixture reactive adhesive, the recording, erasing, and reproducing characteristics which are quite equal to the aforementioned case of this embodiment are obtained on both surfaces and the capacity per each disk can be doubled.

Even if a replica in which an ultraviolet curing resin layer having a tracking groove is formed on the surface of a chemically reinforced glass plate, a polycarbonate plate, a polyolefine plate, an epoxy plate, or an acrylic resin plate by the photopolymerization method is used in addition to a polycarbonate substrate or a polyolefine substrate prepared by the injection method as a substrate of the information recording medium of the present invention, the same results of recording, erasing, and reproducing characteristics are obtained.

As a method of forming the aforementioned substrates and layers, a suitable one is selected from the methods of injection, photopolymerization (2P method), casting, vacuum deposition, in-gas deposition, sputtering, ion beam deposition, ion plating, electron beam deposition, spin coating, and plasma polymerization. It is desirable to form a reflection layer, an inorganic recording layer, and an inorganic protection layer by sputtering because the composition and film thickness can be managed easily and the production cost is low.

What is claimed is:

1. An information recording medium comprising at least a substrate, a recording layer, which is formed directly on said substrate or via a protective layer composed of at least one of an inorganic substance and an organic substance, and in which recording layer atomic arrangement is changed without the shape thereof being changed when a recording energy beam is irradiated and optical constant is changed, and a reflection layer reflecting said recording energy beam, wherein the mean composition of said recording layer is expressed by a general expression of A$_w$Ge$_x$Te$_y$Se$_z$, wherein the values of w, x, y, and z of said general expression are within the ranges of 1<w<15, 0.45<x/(x+y+z)<0.6, 1<y<34, and 1<z<29 respectively and A indicates at least one element of Bi, Al, Ga, In, Si, Sn, Pb, Sc, Ti, V, Cr, Mn, Fe, Co, Ni, Zn, Y, Zr, Nb, Mo, Ru, Rh, Pd, Cd, La, Hf, Ta, W, Re, Os, Ir, Pt, Au, Ag, and Cu.

2. An information recording medium according to claim 1, wherein A of said general expression is Bi.

3. An information recording medium according to claim 1, wherein A of said general expression is one of the elements Cr, Co, and Pd.

4. An information recording medium according to claim 1, wherein A of said general expression is one of the elements Au, Ag, and Cu.

5. An information recording medium according to claim 1, wherein A of said general expression is one of the elements Sn, Si, and Pb.

6. An information recording medium according to claim 1, wherein A of said general expression is one of the elements In, Al, and Ga.

7. An information recording medium according to claim 1, wherein the mean composition of said reflection layer in the direction of film thickness is expressed by a general expression (Au)$_{100-x}$(A)$_x$ (where x indicates atomic percent and has a value of 0.5≦x≦15 and the element expressed by A is at least one of Al, Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, and Bi).

8. An information recording medium according to claim 1, wherein the mean composition of said reflection layer in the direction of film thickness is (Au)$_{100-x}$(Co)$_x$ (where x indicates atomic percent and has a value of 0.5≦x≦15).

9. An information recording medium according to claim 1, wherein the mean composition of said reflection layer in the direction of film thickness is (Au)$_{100-x}$(Ti)$_x$ (where x indicates atomic percent and has a value of 0.5≦x≦15).

10. An information recording medium according to claim 1, wherein the mean composition of said reflection layer in the direction of film thickness is (Au)$_{100-x}$(Mo)$_x$ (where x indicates atomic percent and has a value of 0.5≦x≦15).

11. An information recording medium according to claim 1, wherein the mean composition of said reflection layer in the direction of film thickness is (Au)$_{100-x}$(Pd)$_x$ (where x indicates atomic percent and has a value of 0.5≦x≦15).

12. An information recording medium according to claim 1, wherein the mean composition of said reflection layer in the direction of film thickness is expressed by a general expression (Au)$_{100-y}$(D)$_y$ (where y indicates atomic percent and has a value of 15≦y≦85 and D indicates at least one element of Ag and Cu).

13. An information recording medium according to claim 1, wherein the reflectivity of the medium for a reproduction energy beam from the substrate side is one of (a) 65% or more in an unrecorded portion and 45% or less in a recorded portion, and (b) 45% or less in an unrecorded portion and 65% or more in a recorded portion.

14. An information recording medium according to claim 1, wherein the reflectivity of the medium for a reproduction energy beam from the substrate side is 70% or more in an unrecorded portion and 28% or less in a recorded portion.

15. An information recording medium according to claim 1, wherein the electric resistivity of said reflection layer at 298K is 7 μΩ·cm or more.

16. An information recording medium according to claim 1, wherein said information recording medium has a constitution that a substrate, a lower protection layer, a recording layer, an upper protection layer, and a reflection layer are formed in this order from the substrate side.

17. An information recording medium according to claim 1, wherein said information recording medium has a constitution that a substrate, a lower reflection layer, a lower protection layer, a recording layer, an upper protection layer, and an upper reflection layer are formed in this order from the substrate side.

18. An information recording medium according to claim 1, wherein in a part of said information recording medium, dedicated reproduction data is formed in a shape of concave or convex prepits on the substrate beforehand and coexists with other rewritable data.

19. An information recording medium according to claim 1, wherein content of Se in said recording layer at a side thereof furthest from the substrate is greater than the content of Se in the recording layer at a side thereof closest to the substrate.

20. An information recording medium according to claim 1, wherein reflection layers are located at both sides of said recording layer.

21. An information recording medium according to claim 1, wherein said recording layer has a thickness in a range from 10 nm to 300 nm.

22. An information recording medium according to claim 21, wherein the thickness of the recording layer is in a range of 10 nm to 100 nm.

23. An information recording medium comprising at least a substrate, a recording layer, which is formed directly on said substrate or via a protective layer composed of at least one of an inorganic substance and an organic substance, and in which recording layer atomic arrangement is changed without the shape thereof being changed when a recording energy beam is irradiated and optical constant is changed, and a reflection layer reflecting said recording energy beam, wherein the mean composition of said recording layer is expressed by a general expression of $A_w Ge_x Te_y Se_z$, wherein the values of w, x, y, and z of said general expression are within the ranges of $1<w<15$, $0.45<x/(x+y+z)<0.6$, $1<y\leq 24$, and $1<z<29$ respectively and A is Sb.

24. An information recording medium according to claim 23, wherein A of said general expression is Sb and $2\leq w\leq 10$, and $0.45\leq x/(x+y+z)\leq 0.6$, and $0.45\leq y/(y+Z)$.

25. An information recording medium according to claim 23, wherein $1<y\leq 19$.

26. An information recording medium according to claim 23, wherein $1<y\leq 16$.

27. An information recording medium according to claim 23, wherein the mean composition of said reflection layer in the direction of film thickness is expressed by a general expression $(Au)_{100-x}(A)_x$ (where x indicates atomic percent and has a value of $0.5\leq x\leq 15$ and the element expressed by A is at least one of Al, Si, Sc, Ti, V, Cr, Mn, Fe, Co, Ni, Zn, Ga, Ge, Y, Zr, Nb, Mo, Ru, Rh, Pd, Cd, In, Sn, Sb, Te, La, Hf, Ta, W, Re, Os, Ir, Pt, Tl, Pb, and Bi).

28. An information recording medium according to claim 23, wherein the mean composition of said reflection layer in the direction of film thickness is $(Au)_{100-x}(Co)_x$ (where x indicates atomic percent and has a value of $0.5\leq x\leq 15$).

29. An information recording medium according to claim 23, wherein the mean composition of said reflection layer in the direction of film thickness is $(Au)_{100-x}(Ti)_x$ (where x indicates atomic percent and has a value of $0.5\leq x\leq 15$).

30. An information recording medium according to claim 23, wherein the mean composition of said reflection layer in the direction of film thickness is $(Au)_{100-x}(Mo)_x$ (where x indicates atomic percent and has a value of $0.5\leq x\leq 15$).

31. An information recording medium according to claim 23, wherein the mean composition of said reflection layer in the direction of film thickness is $(Au)_{100-x}(Pd)_x$ (where x indicates atomic percent and has a value of $0.5\leq x\leq 15$).

32. An information recording medium according to claim 23, wherein the mean composition of said reflection layer in the direction of film thickness is expressed by a general expression $(Au)_{100-y}(D)_y$ (where y indicates atomic percent and has a value of $15\leq y\leq 85$ and D indicates at least one element of Ag and Cu).

33. An information recording medium according to claim 23, wherein the reflectivity of the medium for a reproduction energy beam from the substrate side is one of (a) 65% or more in a unrecorded portion and 45% or less in a recorded portion, and (b) 45% or less in an unrecorded portion and 65% or more in a recorded portion.

34. An information recording medium according to claim 23, wherein the reflectivity of the medium for a reproduction energy beam from the substrate side is 70% or more in an unrecorded portion and 28% or less in a recorded portion.

35. An information recording medium according to claim 23, wherein the electric resistivity of said reflection layer at 298K is 7 $\mu\Omega$·cm or more.

36. An information recording medium according to claim 23, wherein said information recording medium has a constitution that a substrate, a lower protection layer, a recording layer, and upper protection layer, and a reflection layer are formed in this order from the substrate side.

37. An information recording medium according to claim 23, wherein said information recording medium has a constitution that a substrate, a lower reflection layer, a lower protection layer, a recording layer, an upper protection layer, and an upper reflection layer are formed in this order from the substrate side.

38. An information recording medium according to claim 23, wherein in a part of said information recording medium, dedicated reproduction data is formed in a shape of concave or convex prepits on the substrate beforehand and coexists with other rewritable data.

39. An information recording medium according to claim 23, wherein content of Se in said recording layer at a side thereof furthest from the substrate is greater than the content of Se in the recording layer at a side thereof closest to the substrate.

40. An information recording medium according to claim 23, wherein reflection layers are located at both sides of said recording layer.

41. An information recording medium according to claim 23, wherein said recording layer has a thickness in a range from 10 nm to 300 nm.

42. An information recording medium according to claim 23, wherein the thickness of the recording layer is in a range of 10 nm to 100 nm.

* * * * *